May 13, 1947.   A. K. ESPENAS   2,420,363
KEYED TURNBUCKLE DEVICE
Filed Feb. 19, 1946
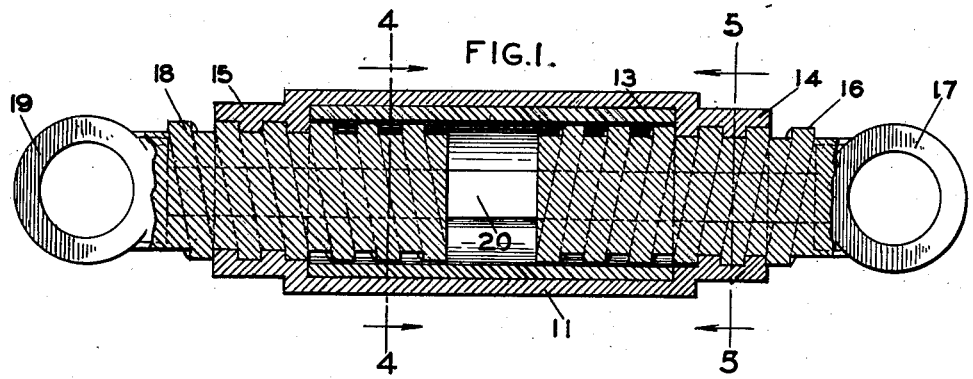
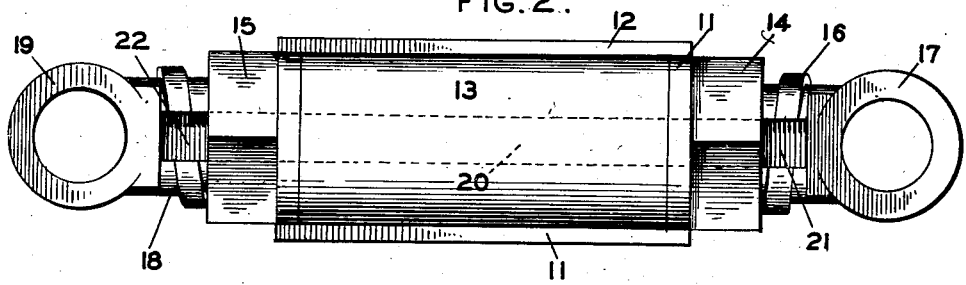
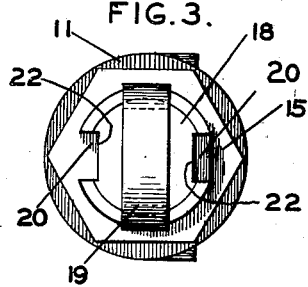
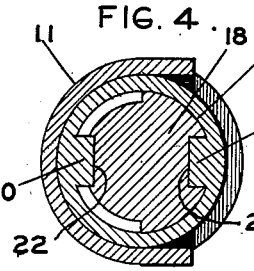
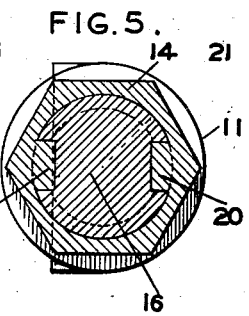
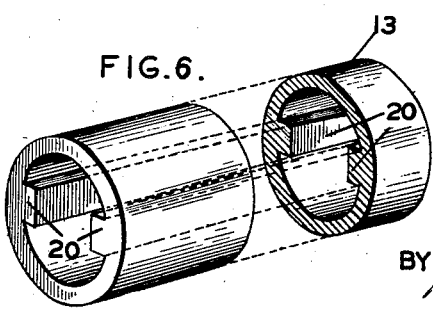
INVENTOR
ARTHUR K. ESPENAS
BY
ATTORNEYS Patented May 13, 1947

2,420,363

UNITED STATES PATENT OFFICE 2,420,363

KEYED TURNBUCKLE DEVICE

Arthur K. Espenas, Denton, Tex.

Application February 19, 1946, Serial No. 648,629

5 Claims. (Cl. 287—60)

This invention relates to turnbuckles, and more particularly to a turnbuckle whose links are keyed to prevent rotation of the links with respect to each other.

A main object of the invention is to provide a novel and improved turnbuckle of very simple construction which is very easy to adjust and which is very stable in adjustment.

A further object of the invention is to provide an improved turnbuckle device which may be adjusted by rotating only a single part, which will not be changed in adjustment by the accidental application of torque to the links, and which may be employed to transmit torque from one link to the other link thereof, thus enabling the device to be used if desired as a connection on a drive shaft or similar shaft.

Further objects and advantages of the invention will become apparent from the following description and claims, and from the accompanying drawings, wherein:

Figure 1 is a longitudinal cross-sectional view taken through a turnbuckle constructed in accordance with the present invention.

Figure 2 is a side elevational view of the turnbuckle of Figure 1.

Figure 3 is an end elevational view of the turnbuckle of Figure 1.

Figure 4 is a transverse cross-sectional view taken on line 4—4 of Figure 1.

Figure 5 is a transverse cross-sectional view taken on line 5—5 of Figure 1.

Figure 6 is a detail perspective view, partly in cross-section, of a keying sleeve member employed in the turnbuckle of Figure 1.

Referring to the drawings, 11 designates a housing which is formed at its intermediate portion, with a generally semi-cylindrical cavity having a rectangular opening 12 at its forward portion adapted to receive a cylindrical sleeve 13 for positioning in said cavity. At one end, housing 11 is formed with an integral collar 14 having a right-handed thread formed in its interior wall surface and at its other end, housing 11 is formed with an integral collar 15 having a left-handed thread formed in its interior wall surface. Threadedly engaged in collar 14 is a first link member 16 having an eye portion 17 and threadedly engaged in collar 15 is a second link member 18 having an eye portion 19. Link member 16 is axially aligned with link member 18.

Sleeve 13 is formed on its interior wall surface with a pair of opposing longitudinal ribs 20, 20. Link member 16 is formed along its threaded shank portion with a pair of longitudinal grooves 21, 21 adapted to slidably receive the ribs 20, 20 at one end portion of sleeve 13 and link member 18 is formed with a pair of longitudinal grooves 22, 22 adapted to slidably receive the ribs 20, 20 at the other end portion of the sleeve. Link members 16 and 18 are thereby keyed together by sleeve 13, whereby relative rotation of said link members is prevented while axial movement of said link members with respect to the sleeve is permitted. Said axial movement takes place when housing 11 is rotated with respect to the link members. For one direction of rotation of housing 11, the link members are moved inwardly toward each other whereas for the opposite direction of rotation of said housing, the link members are separated.

In assembling the turnbuckle sleeve 13 is first inserted into the housing 11 through opening 12. The link members 16 and 18 are then threaded into the respective collars 14 and 15 and are advanced until the grooves in the link members are engaged by the ribs 20, 20 of sleeve 13. Once said grooves are engaged by ribs 20, 20, further adjustment of the link members may be obtained by rotating housing 11 with respect to the link members. This eliminates the inconvenience of having to adjust each link individually and also eliminates the possibility of undesired changes in adjustment caused by accidental application of torque to the links, as in the case where a cable or rope including the turnbuckle is twisted or when tension is imposed on a wire cable or rope including the turnbuckle where said cable or rope is of stranded and twisted construction.

The above described turnbuckle device may be employed, if desired, in a drive shaft, or other shaft connection, since a torque applied to one link is transmitted directly to the other link.

While a specific embodiment of a turnbuckle device has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A turnbuckle comprising a housing, a pair of axially aligned link members threadedly engaged in said housing, one link member having a right-hand thread and the other link member having a left-hand thread, and means in said housing slidably engaging said link members and keying said link members against relative rotation.

2. The structure of claim 1, and wherein said means comprises a sleeve receiving said link members, each link member having a longitudinal groove formed therein and said sleeve having a longitudinal internal rib slidably engaged in the longitudinal grooves.

3. A turnbuckle comprising a housing, a right-hand threaded collar formed at one end of said housing, a first link member threadedly engaged in said right-hand threaded collar, a left-hand threaded collar formed at the other end of said housing in axial alignment with the right-hand threaded collar, a second link member threadedly engaged in said left-hand threaded collar, each link member being formed with a longitudinal groove, a sleeve in said housing receiving the link members, said sleeve being formed with a longitudinal internal rib slidably fitting the grooves in the link members and preventing relative rotation of said link members.

4. The structure of claim 3, and wherein said housing is formed with an opening in its intermediate wall portion adapted to receive said sleeve during assembly of the turnbuckle.

5. A turnbuckle comprising a housing, a right-hand threaded collar formed at one end of said housing, a first link member threadedly engaged in said right-hand threaded collar, a left-hand threaded collar formed at the other end of said housing in axial alignment with the right-hand threaded collar, a second link member threadedly engaged in said left-hand threaded collar, each link being formed with a plurality of longitudinal grooves, a sleeve rotatably positioned in said housing and receiving said link members, said sleeve being formed with a plurality of longitudinal internal ribs slidably fitting the grooves in the link members and preventing relative rotation of said link members, said housing being formed with a rectangular opening in its wall portion intermediate the ends thereof adapted to receive said sleeve during assembly of the turnbuckle.

ARTHUR K. ESPENAS.